United States Patent
Syme et al.

(10) Patent No.: US 10,528,731 B1
(45) Date of Patent: Jan. 7, 2020

(54) DETECTING MALICIOUS PROGRAM CODE USING SIMILARITY OF HASHED PARSED TREES

(71) Applicant: AREA 1 SECURITY, INC., Redwood City, CA (US)

(72) Inventors: Philip Syme, Ellicott City, MD (US); Torsten Zeppenfeld, Emerald Hills, CA (US); Peter Stein, Oak Park, IL (US)

(73) Assignee: AREA 1 SECURITY, INC., Redwood City, CA (US)

( * ) Notice: Subject to any disclaimer, the term of this patent is extended or adjusted under 35 U.S.C. 154(b) by 76 days.

(21) Appl. No.: 15/711,765

(22) Filed: Sep. 21, 2017

(51) Int. Cl.
*G06F 21/56* (2013.01)
*G06F 8/41* (2018.01)

(52) U.S. Cl.
CPC ............ *G06F 21/563* (2013.01); *G06F 8/427* (2013.01); *G06F 21/565* (2013.01)

(58) Field of Classification Search
CPC ....... G06F 21/563; G06F 8/427; G06F 21/565
See application file for complete search history.

(56) References Cited

U.S. PATENT DOCUMENTS

2016/0357965 A1* 12/2016 Prowell ................. G06F 21/566

OTHER PUBLICATIONS

Breitinger et al. (Approximate Matching: Definition and Terminology, NIST Special Publication 800-168, May 2014, 21 pages) (Year: 2014).*
Karonen et al. (How to hash a list of multiple items? Aug. 2013, 3 pages) (Year: 2013).*

* cited by examiner

*Primary Examiner* — Oleg Korsak
(74) *Attorney, Agent, or Firm* — Hickman Palermo Becker Bingham LLP; Malgorzata A. Kulczycka

(57) ABSTRACT

Techniques are described herein for detecting malicious program code stored on computer devices before the code can be executed to potentially compromise a computer network. In an embodiment, a method comprises receiving, at a computer device, a file containing instructions in a programming language; based on a syntax of the programming language, parsing the file to generate parsed information, and based on the parsed information, generating a syntax tree for the file; identifying one or more alphanumeric strings in the syntax tree, and based on the alphanumeric strings, generating a syntax string for the syntax tree; generating a hash digest by applying a piecewise hashing to the alphanumeric strings in the syntax string; determining whether the hash digest indicates that the file contains potentially malicious code; in response to determining that the hash digest indicates that the file contains the potentially malicious code, performing a responsive action.

17 Claims, 8 Drawing Sheets

```
01  function example(){
02     //geometric sequence of increasing circumferences
03     var i;
04     var j;
05     j = 1;
06
07     for(i = 1; i < 10; i++) {
08        j=j*i;
09     }
10
11     utility(j);
12  }
13
14  function utility(x){
15     //circumference where 'x' is the diameter
16     return x * 3.14159;
17  }
```

FIG. 3A

```
01  AST Root
02    FunctionNode
03      Name
04      Block
05        VariableDeclaration
06          VariableInitializer
07            Name
08        VariableDeclaration
09          VariableInitializer
10            Name
11        ExpressionStatement
12          Assignment
13            Name
14            NumberLiteral
15        ForLoop
16          Assignment
17            Name
18            NumberLiteral
19          InfixExpression
10            Name
11            NumberLiteral
12          UnaryExpression
13            Name
14          Scope
15            ExpressionStatement
16              Assignment
17                Name
18                InfixExpression
19                  Name
20                  Name
21            ExpressionStatement
22              FunctionCall
23                Name
24                Name
25    FunctionNode
26      Name
27      Name
28      Block
29        ReturnStatement
30          InfixExpression
31            Name
32            NumberLiteral
```

DETECTING MALICIOUS PROGRAM CODE USING SIMILARITY OF HASHED PARSED TREES

FIELD OF THE DISCLOSURE

The present disclosure generally relates to computer security techniques applicable to computers that have been compromised with bots and other malware, and relates more specifically to techniques for detecting malicious program code using hash digests.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As attempts to compromise security of computer networks become more and more sophisticated, methods of infecting data files with malicious code also have become more complex. Computers are usually protected at an edge of a network by specialized appliances such as firewalls. However, many firewalls have been ineffective in protecting the network from virus and worm penetration. Firewalls may be configured to detect computer viruses which have already penetrated a network. For example, some firewalls may be configured to detect that a suspicious activity is taking place in the network, and subsequently transmit notifications about the activity to technicians who may take actions to minimize consequences of the suspicious activity. Upon receiving the notifications, the technicians may for example, scan files stored on the network's devices, or change access passwords for the files. However, by then, the network is at least partially compromised. Better techniques for computer security in this context are needed.

SUMMARY OF INVENTION

The appended claims may serve as a summary of the invention.

BRIEF DESCRIPTION OF THE DRAWINGS

In the drawings:

FIG. 3A illustrates an example JavaScript file that may be used in a language aware fuzzy hashing;

FIG. 3B illustrates an example abstract syntax tree generated from an example JavaScript file;

DETAILED DESCRIPTION

Figure 1:
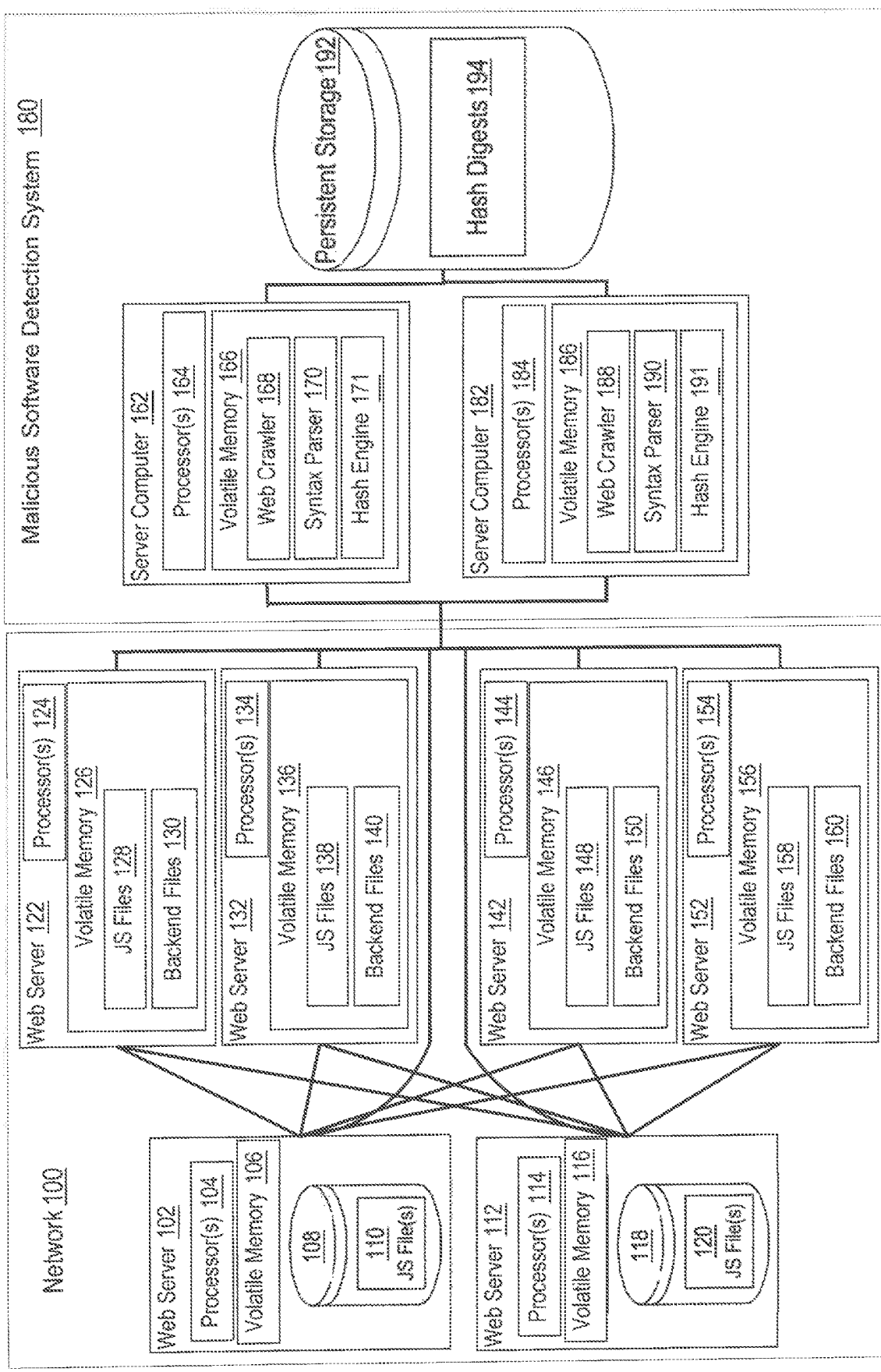
FIG. 1 illustrates an example computer system architecture for detecting malicious program code using similarity of hashed parsed trees.

In the following description, for the purposes of explanation, numerous specific details are set forth in order to provide a thorough understanding of the present. It will be apparent, however, that the present approach may be practiced without these specific details. In other instances, well-known structures and devices are shown in block diagram form to avoid unnecessarily obscuring the present approach.

General Overview

Techniques are described herein for detecting malicious program code before the code can be executed to potentially compromise a computer network. In an embodiment, a method is programmed for scanning data files stored on computer devices and then determining whether the files contain malicious code. The scanned data files may include, for example, JavaScript ("JS") files or other types of script files stored on any devices deployed in computer networks or on the World Wide Web ("WWW"). Determining whether a data file includes malicious code includes analysis of the file that is performed before the file is disseminated in a network and allows detecting malicious code before the code is executed and potentially corrupts communications within the network.

Analysis of a file may start with parsing the file to identify specific statements, keywords and/or phrases present in the file, and using the identified specific statements/keywords/phrases to generate parsed information. The parsed information may be used to generate an abstract syntax tree ("AST"). The AST is an encoded representation of language-specific statements, keywords and/or phrases identified in the file. An AST may include for example, representations of specific schemes, classes, functions and other elements that are present in the file and that are specific to a particular programming language. Some contents of the file may be ignored or abstracted, and thus omitted in generating an AST. Examples of the information that might be ignored/abstracted in generating an AST may include comments and names of certain variables.

The resulting AST may be processed to generate a hash digest for the AST. A hash digest may be generated by performing a piecewise hashing, also known as a "fuzzy hashing," on a flattened AST such as a one-string-long alphanumeric representation of the AST. Fuzzy hashing may include flattening the AST and dividing a flattened representation of the AST into portions, or chunks, by executing for example, a rolling hash function on the flattened AST. Executing the rolling hash function may include defining a particular binary sequence as a delimiter, using the delimiter to delineate and identify the chunks in the flattened AST, and extracting the chunks from the flattened AST.

A delimiter for delineating chunks in a flattened AST may be defined for example, as a binary string "000." Once the delimiter is determined, each time the "000" sequence is encountered in the flattened AST, a new chunk is created. Another way of determining chunks for an AST is to select a fixed length of a chunk and dividing the flattened AST into chunks having the same, or almost the same, fixed length. Once chunks for a flattened AST are created, each of the chunks is hashed into a sub-digest. The sub-digests may be concatenated with each other to form a large hash digest ("LHD"). The LHD may be used to represent the flattened AST as well as the data file from which the AST was generated.

Sub-digests generated for a flattened AST are independent and thus an LHD that is generated by concatenating sub-digests is usually unique for the data file. Therefore, LHDs generated for identical data files are usually identical, while LHDs generated for different data files are usually different.

For example, if an original data file has been infected with a virus, then an LHD generated for the original data file and an LHD generated for an infected data file most likely will be different.

Determining whether a particular file includes malware may be performed by determining whether an LHD generated for a particular file is similar to or different from LHDs known to be malware-free. For example, if an LHD generated for a particular file and an LHD generated for the malware-free original file are different even though the LHDs are expected to be identical, then a programmed system may determine that the particular file has been compromised or infected with a virus, or has a probability of malware. In fact, even a small difference between LHDs generated for the corresponding data files may indicate that the files are different, and thus one of them might have been compromised.

Determining whether a particular file includes malware may also be performed by determining whether an LHD generated for the particular file is similar to an LHD generated for another file that is known to contain malware-free. For example, if LHDs generated for two data files are similar and it is known that one of the two data files contains malware, then a conclusion may be drawn that both data file may be compromised or infected with a virus.

The fuzzy hashing approach described herein is versatile and allows detecting many types of phishing attacks. The fuzzy hashing technique may prevent penetration of malicious code in a network because it allows detecting a phishing attack before the malicious code is disseminated in the network. For example, if it is suspected that an original data file has been infected with malicious code, then an LHD generated for the original data file and an LHD generated for the potentially infected file are different, and therefore, the potentially infected file may be flagged and its dissemination in the network may be banned.

A fuzzy hashing technique allows generating ASTs that are independent from certain terms which are included in data files, but which are not part of potentially malicious code. Such terms may include for example, comments or names of certain variables. Therefore, ASTs may be identical if they are generated for the files that differ only by for example, comments included in the files.

While information about comments or names of certain variables in a data file may be abstracted for generating an AST, that information may be stored for future references. The stored information may be used to for example, perform an additional analysis of the data file or determining a source of a phishing attack.

Example Computer System Architecture

FIG. 1 is a block diagram illustrating an example system architecture for detecting malicious program code using similarity of hashed parsed trees.

In the example of FIG. 1, a computer system includes a malicious software detection system 180 and a network 100, which may comprise any type and number of end stations such as computing devices, organized as one or more computer subnetworks. Any number of routers, switches or other internetworking gear may be present. In the example of FIG. 1, network 100 includes web servers 102, 112, 122, 132, 142, 152 for purposes of illustrating a clear example but other embodiments of network 100 may comprise different numbers of web servers. Web servers 102, 112, 122, 132, 142, 152 may include processors 104, 114, 124, 134, 144, 154, respectively, and volatile memory units 106, 116, 126, 136, 146, 156, respectively. Some of the servers may also include persistent storage devices 108, 118. Volatile and persistent storage systems may be used to store data files, including JS files 110, 120, 128, 138, 148, 158. Some of the web servers may store backend files 130, 140, 150, 160.

Malicious software detection system 180 may include one or more server computers, such as server computers 162, 182. Server computers 162, 182 may comprise general-purpose computers, programmed as described herein, and include processors 164, 184, and volatile memory units 166, 186, respectively. The server computers employ processors 164, 184 and volatile memory units 166, 186 to execute instructions of web crawler applications 168, 188, syntax parser applications 170, 190, and hash engine application 171, 191. For example, volatile memory unit 166 may be used to store executable instructions for web crawler application 168, a syntax parser application 170, and a hash engine application 171, while processor 164 may execute the stored instructions to perform the functionalities of a web crawler, a syntax parser and a hash engine. Web crawler applications 168, 188 are also referred to as web crawlers. Syntax parser applications 170, 190 are also referred to as syntax parsers. Hash engine applications 171, 191 are also referred to as hash engines.

Detection system 180 may also include persistent storage 192 for storing hash digests 194 and any other data useful in generating sub-digests and large hash digests. System 180 may also include additional devices that are not depicted in FIG. 1.

Web Crawler

Web crawlers 168, 188 may be implemented on server computers 162, 182 of malicious software detection system 180, or may be implemented on standalone servers that communicate with malicious software detection system 180. Web crawlers 168, 188 may be configured to systematically browse contents stored in network 100 to seek files that potentially include malicious code. Network 100 may be any type of computer network, including the WWW. Web crawlers 168, 188 may browse the content of network 100 to determine URLs that point to the webpages and files stored on devices of network 100. The identified URLs may be assigned to server computers 162, 182, respectively.

The assigned URLs may be communicated to respective syntax parsers 170, 190. Syntax parsers 170, 190 may use the assigned URLs to download the JS files from the locations indicated by the URLs to volatile memory 166 or 186, respectively, or persistent storage 192. Syntax parsers 170, 190 may parse the downloaded files and collaborate with hash engines 171, 191 to determine whether the files include malicious code.

Web crawlers 168, 188 may operate in a map-reduce mode that is programmed to prevent assigning the same URL to both server computers 162, 182. In map-reduce mode, web crawlers 168, 188 assign a URL to either server computer 162 or 182, but not to both. Web crawlers 168, 188 may also scan webpages identified by the URLs for out links included in the webpages, and those can be further scanned for additional out links, and so on. In the map-reduce mode, an out link is assigned to either server computer 162 or server computer 182, but not to both.

Assigning a URL to either server computer 162 or server computer 182 may be performed using a hashing function. For example, web crawler 168, 188 may apply a hashing function to a particular URL, and based on a hash value generated from the particular URL, determine whether to assign the particular URL to server computer 162 or server computer 182. Since sever computers 162, 182 have assigned different URLs, server computers 162, 182 process different URLs, and therefore, server computers 162, 182 can operate in parallel. For example, assume that server computer 162 has been assigned URLs hosted by web server 122. However, to run a particular web application, the URLs hosted by web server 122 use local JS files 128 (indicated by out links) and remote JS files 110 (indicated by out links). Suppose that web crawler 168 applies a hashing function to URLs pointing to JS files 128 and 110, and determines that the URLs pointing to JS files 128 need to be assigned to server computer 162, while the URLs pointing to JS files 110 need to be assigned to server computer 182. Thus, JS files 128 will be processed by server computer 162, while JS files 110 will be processed by server computer 182. Since server computer 162 and server computer 182 will process different JS files, server computers 162, 182 can perform their respective tasks in parallel.

In map-reduce mode, sever computer 162 or 182 processes a JS file unless the file has been already processed. For example, suppose that server computer 162 has been assigned URLs hosted by web server 122, and the URLs hosted by web server 122 point to webpages that have out links to local JS files 128 and remote JS files 110. Suppose that web crawler 168 applies a hash function to the URLs pointing to JS files 128 and the URLs pointing to JS files 110, and based on the obtained hash values, assigns the URLs pointing to JS files 128 and 110 to sever computer 162. However, before processing JS files 128, 110, server computer 162 may check if any of the JS files 128, 110 have been already processed. Suppose that JS files 110 have been already processed by server computer 182. If JS files 110 have been already processed, then processing JS files 110 again would be redundant. Thus, in the map-reduce mode, server computer 162 receives a notification that indicates that JS files 110 have been already processed by server computer 182. The notification may also identify a location of the results generated for JS files 110. Upon receiving the notification, server computer 162 may retrieve the results generated for remote JS files 110, and use the retrieved results instead of generating its own results for remote JS files 110.

Syntax Parser

Syntax parsers 170, 190 may be implemented on server computers 162, 182 of malicious software detection system 180, or may be implemented on standalone servers that communicate with malicious software detection system 180. Syntax parsers 170, 190 may be configured to parse data files and generate ASTs for the files. Parsing a file may include scanning the file to identify specific statements/keywords/phrases in the file, and generating parsed information that includes all the identified statements/keywords/phrases, and no other data. Generating an AST for the file may include representing the parsed information as a tree having nodes and links connecting the nodes.

To scan a file, syntax parsers 170, 190 may generate a query that includes regular expressions specific to the programming language in which instructions in the file are represented. For example, syntax parser 170 may execute the query against the file to find out if the language-specific keywords/statements/phrases are present in the file. In the case of a JS file, syntax parser 170 may scan the JS file to identify JS-specific statements present in the file. Examples of the JS-specific statements may include: Array Literal, Block, Catch Clause, Comment, Conditional Expression, Element Getter, Empty Expression, Empty Statement, Error Node, Expression Statement, Function Call, If Statement, Infix Expression, Jump, Keyword Literal, Labeled Statement, Name, Number Literal, Object Literal, Parenthesized Expression, Regular Expression Literal, Return Statement, String Literal, Switch Statement, Throw Statement, Try Statement, Unary Expression, Variable Declaration, Variable Initializer, With Statement, Xml Fragment, Xml Literal, Xml Reference, and Yield Statement. In the case of different files, other language-specific statements may be identified.

Generating an AST for a file may include generating a tree-like AST representation of parsed information obtained from the file. A tree-like AST representation may include nodes and links that connect the nodes. For example, a tree representation may have an AST root node, one or more other nodes connected to the function nodes, and so forth. An AST for a file is generated in such a way that the corresponding tree representation captures the relationships established between the language-specific statements/keywords/phrases in the file. Typical relationships include sequential relationships and nested relationships; however, other types may also be included.

In mapping relationships between language-specific statements/keywords/phrases and nodes in an AST, in one approach, sequential relationships between the statements in a file are mapped onto nodes located on the same level in a hierarchical tree of the AST, while nested relationships between the statements in a file are mapped onto nodes that are on different levels in the hierarchical tree of the AST. For example, if a file includes three statements/instructions that are to be executed sequentially, then syntax parser 170 may generate an AST that has one AST root and three nodes, each node directly connected to the AST root and each node representing one of the three statements/instructions.

However, if a file includes a first statement/instruction that has a second, nested statement/instruction, then syntax parser 170 may generate an AST that has one AST root and two nodes: a first node is directly connected to the AST root and represents the first statement/instruction, while a second node is directly connected to the first node and represents the second statement/instruction. This may be illustrated using a following example: suppose a JS file includes an "if" statement nested within another "if" statement. In this situation, syntax parser 170 generates an AST that has an AST root, a first node that is directly connected to the AST root and corresponds to the first "if," and a second node that is linked to the first node and represents the nested "if."

Syntax parsers 170, 190 may generate a multi-hierarchical AST that captures the hierarchical relationships between language-specific statements/keywords/phrases included in a file regardless of complexity of the relationships. For example, if a JS file includes some statements that are to be executed sequentially and other statements that are nested within each other, then all sequential and nested relationships may be represented in a multi-hierarchical AST.

If two data files are similar, then syntax parsers 170, 190 will most likely generate similar ASTs for the files. If certain terms, such as comments and names of certain variables in the files, are ignored or abstracted for generating ASTs, the ASTs may be identical if they are generated for the files that are identical except for the comments and the names of certain variables.

Some nodes in an AST may be sorted. The sorting is performed to speed up the future processing of the AST. It may for example, simplify and speed up the process of comparing the ASTs and determining whether the corresponding files have been infected with viruses. The sorting may include sorting the nodes (and the corresponding subtrees) that are on the same level in a hierarchical AST. The nodes may be sorted based on an alphabetical order of the names associated with the nodes. After performing the sort operation on the nodes of several ASTs, comparing the ASTs to determine whether the ASTs are similar/identical may be performed faster on sorted ASTs than if the ASTs were unsorted.

Once an AST is generated for a file, syntax parsers 170, 190 invoke hash engines 171, 191, respectively, and hash engines 171, 191 generate a hash digest for the AST.

Hash Engine

Hash engines 171, 191 may be implemented on server computers 162, 182 of malicious software detection system 180, or may be implemented on standalone servers that communicate with malicious software detection system 180. Hash engines 171, 191 are also referred to as context-triggered piecewise hash engines, and may be configured to process ASTs provided as tree-like representations or as already flattened ASTs.

If an AST is provided as a tree-like representation, then hash engines 171, 191 may process the representation using for example, a depth search engine to flatten the AST and generate a flattened AST. Flattening the AST may include traversing each node in the AST starting from an AST root node and ending on the last node in the AST, and outputting the node information in a form of an alphanumeric string. The alphanumeric string is also referred to as a flattened AST, and may be directly input into context-triggered piecewise hash engines 171, 191.

Hash engines 171, 191 and syntax parsers 170, 190 may be configured to asynchronously process ASTs, and once an AST is flattened either by a hash engine or a syntax parser, the flattened AST is communicated to any of hash engines 171, 191. For example, once a syntax parser 170 produces an alphanumeric string for an AST, the string may be further processed by hash engine 171.

Hash engines 171, 191 process a flattened AST and generate an LHD for the AST. Generating an LHD may include dividing the flattened AST into chunks, generating sub-digests for the chunks, and concatenating the sub-digests into an LHD. Because an LHD is generated from sub-digests which uniquely encode the characteristics of code instructions included in a data file, the LHD is unique for the data file. The LHDs and sub-digests may be stored as hash digest 194 in persistent storage 192, in volatile memory 166, 186, or in any other storage device accessible to malicious software detection system 180.

Digests and sub-digests generated for a data file capture characteristics of code instructions included in the data file. For example, an LHD generated for an original file will most likely be different from an LHD generated for a modified original file. The differences between the LHD generated for the original file and the LHD generated for the modified original file are proportional to the amount of code changes in the original file. Thus, the bigger the differences between the original file and the modified original file, the bigger the differences between the LHD generated for the original file and the LHD generated for the modified original file. As more code is modified in the original file, the easier it is to determine the differences between the LHDs generated for the original file and the modified original file, and the easier it may be to detect a computer virus.

Clustering Engine

Although not depicted in FIG. 1, in some embodiments, server computers 162, 182 include clustering engines. A clustering engine may be a hardware/software implementation of a clustering management system that is configured to manage hash digests 194 stored in persistent storage 192, volatile memory 166, 186, or other storage devices. The clustering engine may be configured to for example, generate a mapping between hash digests 197 and the corresponding data files, cluster the corresponding files into clusters, and determine similarities between the files based on the clusters. The clustering engine may implement simple probabilistic approaches and various machine-learning approaches to determine similarities between hash digests 194 and to map the corresponding files to the clusters.

Detecting Malicious Program Code

Figure 2:
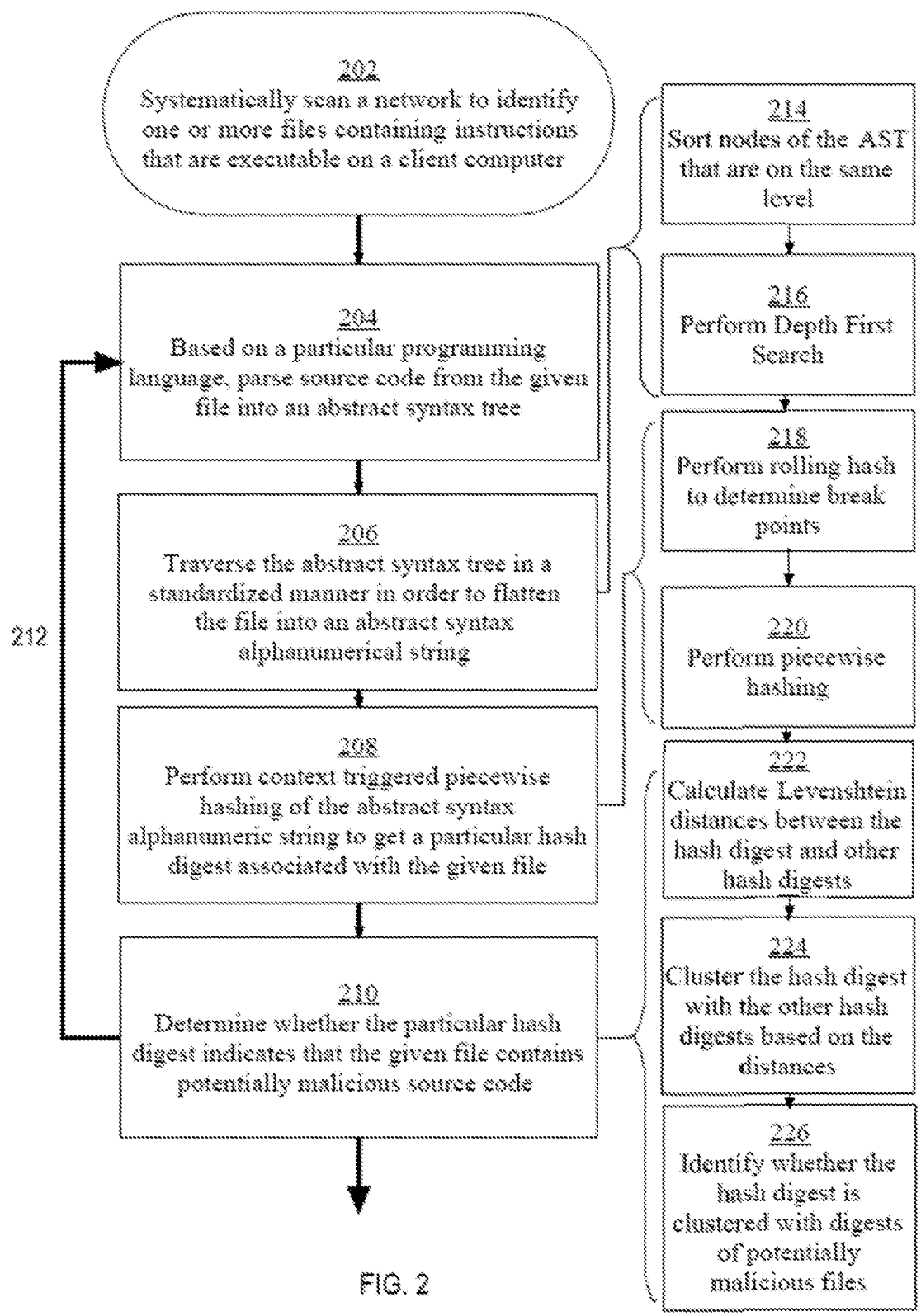
FIG. 2 illustrates an example process for detecting malicious program code using similarity of hashed parsed trees.

FIG. 2 illustrates an example process for detecting malicious program code using similarity of hashed parsed trees. For purposes of illustrating a clear example, FIG. 2 is described herein in the context of FIG. 1, but the broad principles of FIG. 2 can be applied to other systems having configurations other than as shown in FIG. 1. Further, FIG. 2 and each other flow diagram herein illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 2 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

At step 202, one or more servers systematically scan a network to identify one or more files containing instructions that are executable on client computers. An example JS file that may be used is described in FIG. 3A. Examples of the servers include web servers 102, 112, 122, 132, 142, 152, or others. The client computers may include any computing devices in network 100.

Identifying the files containing instructions may include identifying URLs that point to the files, and using the URLs to access and download the files to volatile memory units 106, 116, 126, 136, 146, 156, or other storage devices accessible to web servers 102, 112, 132, 142, 152.

Assigning Files to Server Computers

Once the identified files are downloaded to volatile memory units, the files are assigned to server computers configured to detect malicious software. The server computers may include server computers 162, 182, or any other server computers configured as the detector. The files are assigned to server computers 162, 182 in such a way that each file is assigned to either server computer 162 or server computer 182, but not to both. Assigning a file to a server computer may include performing a hashing function on the URL pointing to the location of the file on the server, and using the obtained hash value to determine whether to assign the file to server computer 162 or server computer 182.

Generating an Abstract Syntax Tree for a File

At step 204, server computers 162, 182 generate ASTs for the identified files. This is performed by parsing the source code of the file, identifying the programming language-specific statements/keywords/phrases in the file, and generating a tree-like representation that contains nodes corresponding to the statements/keywords/phrases. An example AST generated for an example JS file is described in FIG. 3B.

Generating an Alphanumeric String for the Abstract Syntax Tree

At step 206, an AST is traversed by server computer 162 or server computer 182 to generate a flattened representation of the AST. The flattened representation of the AST may be generated by traversing the nodes of the AST and generating an alphanumeric string based on the contents of the traversed nodes. More specifically, that process may include performing step 214 and step 216 as depicted in FIG. 2.

At step 214, the AST is traversed and nodes that are on the same hierarchical level of the AST are sorted. The sorting is performed to speed up the future processing of the AST and the future comparison of the AST.

At step 216, a depth first search is performed on the sorted AST. During the depth first search, contents of the nodes in the sorted AST are examined and extracted, and the extracted contents are concatenated to form an alphanumeric string. The alphanumeric string is referred to as a flattened AST. An example alphanumeric string generated for an example AST is described in FIG. 3C.

Performing a Context Triggered Piecewise Hashing on an Alphanumeric String

At step 208, a context triggered piecewise hashing is performed on the alphanumeric string of the AST. The hashing is performed on the string to generate a hash digest. More specifically, that process may include performing step 218 and step 220 as depicted in FIG. 2.

At step 218, a rolling hash is performed on the alphanumeric string to determine break points in the string, and to divide the string into chunks based on the location of the break points in the string. A break point may be defined as a delimiter, such as a string "000", or any other predefined data string. The delimiter is used to delineate the chunks in the string. Since the delimiter "000" may occur in the string randomly, the chunks determined using this method may have different sizes.

Alternatively, a break point may be defined by providing a count of elements to be included in a chunk. Thus, a string may be divided into chunks having the same, or similar, size. For example, if a data string includes at least 4 k bits of data, then the data string may be divided into segments, each of which contains no more than 4 k bits of data. If a data string includes less than 4 k bits of data, then the data string may be divided into segments of 64 bits of data, or so.

Once the string is divided into chunks, the chunks are hashed at step 220 to obtain sub-digests for the chunks. Each chunk is individually hashed to generate a sub-digest for the chunk. Once sub-digests are generated for all chunks, the sub-digests may be concatenated into an LHD. The LHD represents the data file for which the LHD was computed. Typically, each sub-digest in the LHD is independent from other sub-digests in the LHD. Examples of LHDs generated for example alphanumeric strings are depicted in FIG. 3D.

If a conventional hashing is applied to a data string, then typically only one digest (checksum) is generated. In contrast to conventional hashing where a single hash for the string is generated, in a piecewise hashing many discrete sub-digests for the string are generated, and the sub-digests are concatenated into one LHD. Specifically, an arbitrary hashing algorithm is executed on the data string to generate sub-digests for chunks of the string. A sub-digest for a chunk may be generated by computing for example, a checksum for the chunk. If the data string is divided for example, into for example, ten chunks, then applying the piecewise hashing to the chunks will result in generating ten sub-digests. Then the sub-digests are concatenated into one LHD.

Piecewise hashing may be implemented using either cryptographic hashing algorithms, such as MD5 in dcfldd, or more traditional hashing algorithms such as a Fowler/Noll/Vo (FNV) hash.

Determining Whether a File Contains Malware

At step 210, the LHD generated for the AST for the particular file is compared with LHDs generated for other files to determine whether the particular file has been compromised.

Determining whether the particular file has been compromised may be performed by checking whether the LHD generated for the particular file is similar to the LHDs generated for files that are known to be malware-free, or is similar to the LHDs generated for files that are malware-free. For example, if the LHD generated for the particular file and an LHD generated for a malware-free file are similar, then a conclusion may be drawn that the particular file might be malware-free. However, if the LHD generated for the particular file and an LHD generated for a compromised file are similar, then a conclusion may be drawn that the particular file might have been compromised.

Differences and/or similarities between LHDs may be determined using different approaches. One way to determine the differences and/or similarities is to compute Levenshtein distances between LHDs, and use the distances to determine whether the corresponding files are different or similar. More specifically, the approach includes computing Levenshtein distances between the LHDs, clustering the corresponding files into clusters based on the corresponding LHDs, and determining whether a particular file belongs to a cluster that contains the malware-free files or to a cluster that contains the compromised files.

A Levenshtein distance is a measure of similarities between two alphanumeric strings and is defined as a count of deletions, insertions, and/or substitutions required to transform one of the two strings to the other string. If two strings are identical, then the Levenshtein distance between the two strings is zero because no deletion/instruction/substitution is required to transform one string to the other. If two strings differ by just one element, then a Levenshtein distance between the two strings is one because only one substitution of one element in one string is required to conform that string to the other string. An example implementation of the comparison of the LHDs is described in steps 222, 224 and 226 depicted in FIG. 2.

At step 222, Levenshtein distances between an LHD determined for a particular file and LHDs determined for other files are computed. For example, if a Levenshtein distance is computed for the particular LHD that includes a string of "01234" and another LHD that includes "01224", then the distance between the two LHDs is one because only one substitution of one element in the particular LHD is required to transform the particular LHD to the other LHD.

Once the Levenshtein distances are computed for the particular LHD and other LHDs, at step 224, the corresponding particular file is associated with one of the clusters determined for the other LHDs. The grouping may be based on certain rules. For example, two data files having the corresponding LHDs may belong to the same cluster if a Levenshtein distance between the two LHDs does not exceed a certain threshold value. This may be illustrated using the following example: suppose the certain threshold value is five. If a particular Levenshtein distance between the particular LHD and another LHD is zero, then the corresponding data files will belong to the same cluster. However, if a particular Levenshtein distance between the particular LHD and another LHD is six and the threshold value is five, then the corresponding data files will belong to different clusters. Example data file clusters are described in FIG. 3E.

At step 226, server computers 162, 182 determine whether the particular file belongs to a cluster that includes a file that is known, or suspected, to contain malware or to a cluster that includes a file that is known to be malware-free. If a particular file is clustered along with other files known/suspected to contain malware, that a conclusion may be drawn that the particular file has also been infected with a virus. However, if a particular file is clustered along with other files known to be malware-free, then a conclusion may be drawn that the particular file is most likely malware-free.

The conclusions may be expressed as a measure of the likelihood or probability. For example, if a particular file belongs to a cluster that includes some files known to be malware-free and some files known to contain malware, then the determination whether the particular file is malware-free will most likely be expressed as a probability indicating the likelihood that the particular file is malware-free. The probability may be determined as a ratio determined based on a count of the infected files and a count of the malware-free files in a cluster. Hence, if a cluster contains the following files: a particular file, three infected files and two malware-free files, then the probability that the particular file is compromised may be expressed as 3/5, or as 60%. The probability may also be computed using other methods, such as a weighted-ratio based method.

As indicated by arrow 212, the process for detecting malicious program code using similarity of hashed parsed trees is repeated for each file identified as containing executable instructions.

Data files that are potentially compromised may be analyzed, flagged, or otherwise marked as potentially infected. The files may be further analyzed and subjected to a higher-level scrutiny process. For example, the files may be subjected to a machine learning process in which the contents of the files are analyzed and provided via the machine learning's feedback loops to further refine the results of the clustering algorithm. Based on the refined clustering, the determination may be made whether any of the files has been indeed compromised.

Example Javascript File

FIG. 3A is an example JavaScript file that may be used in a language aware fuzzy hashing. An example JS file 300 includes two functions: a function example, 302 and a function utility 304. Functions 302 and 304 include JS-specific keywords, such as the word "function." They also include JS-specific statements such as parameter names i, j, and x, and JS-specific phrases such as constants.

Example JS file 300 is rather simple as it contains very few code instructions, and it is provided to merely illustrate some of the JS keywords/statements/phrases that may be identified by the servers as the servers scan files stored in network 100.

Example Abstract Syntax Tree

FIG. 3B is an example AST generated from an example JS file. The depicted example is provided to merely illustrate an example multi-hierarchical AST that was generated from some JS file, and not necessarily from a JS file depicted in FIG. 3A.

Typically, an AST has one AST root. In the depicted example, the AST has an AST Root 312.

Generally, an AST may have any number of function nodes. In the depicted example, the AST has a FunctionNode 314 and a FunctionNode 316. FunctionNodes 314, 316 are directly connected to AST Root 312. Other ASTs may have just one function node, or more than two function nodes.

Generally, function nodes in an AST correspond to instructions/functions that are invoked sequentially, instructions/functions that are nested within each other, and/or instructions/functions that are in a hybrid configuration. An AST is created in such a way that it captures all relationships present in the JS file.

In an AST, if function nodes are depicted on the same hierarchical level, then the corresponding functions in a JS file are invoked sequentially. If function nodes are depicted in an AST on different levels, then the corresponding functions in a JS file are nested or are in a hybrid configuration. In the depicted AST, FunctionNodes 314 and 316 are shown on the same level, and therefore, they correspond to functions in a JS file that are invoked sequentially.

Example of an Encoded Abstract Syntax Tree

Figure 3C:
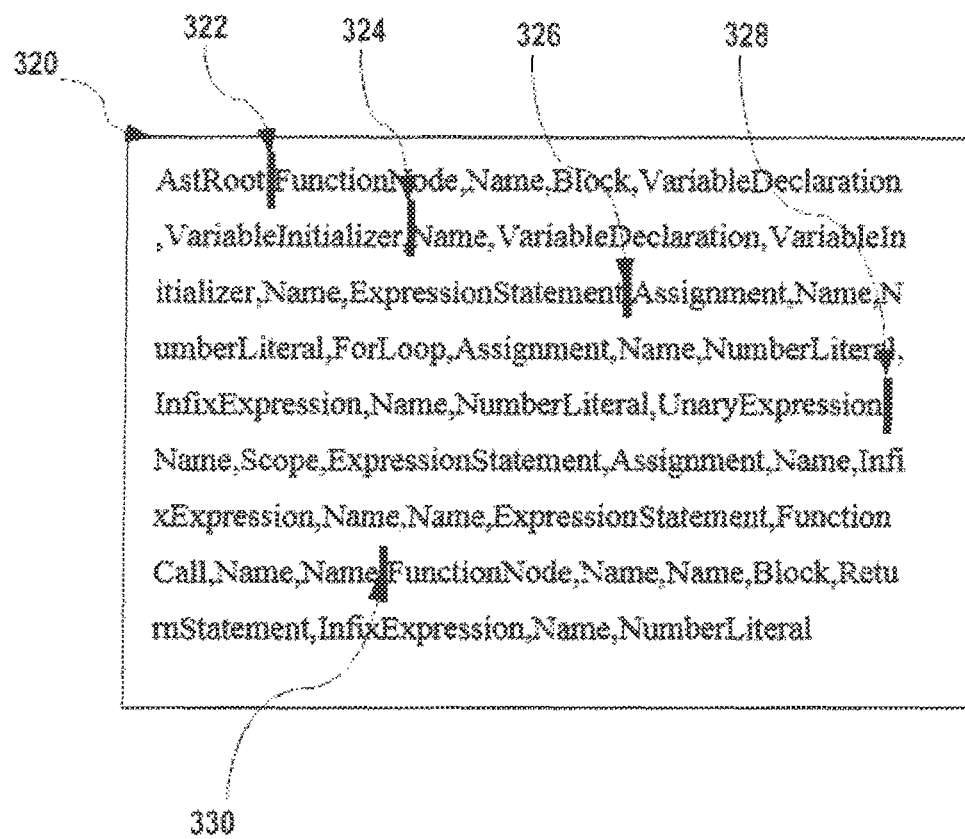
FIG. 3C illustrates an example alphanumeric string generated for an example abstract syntax tree.
Figure 3D:
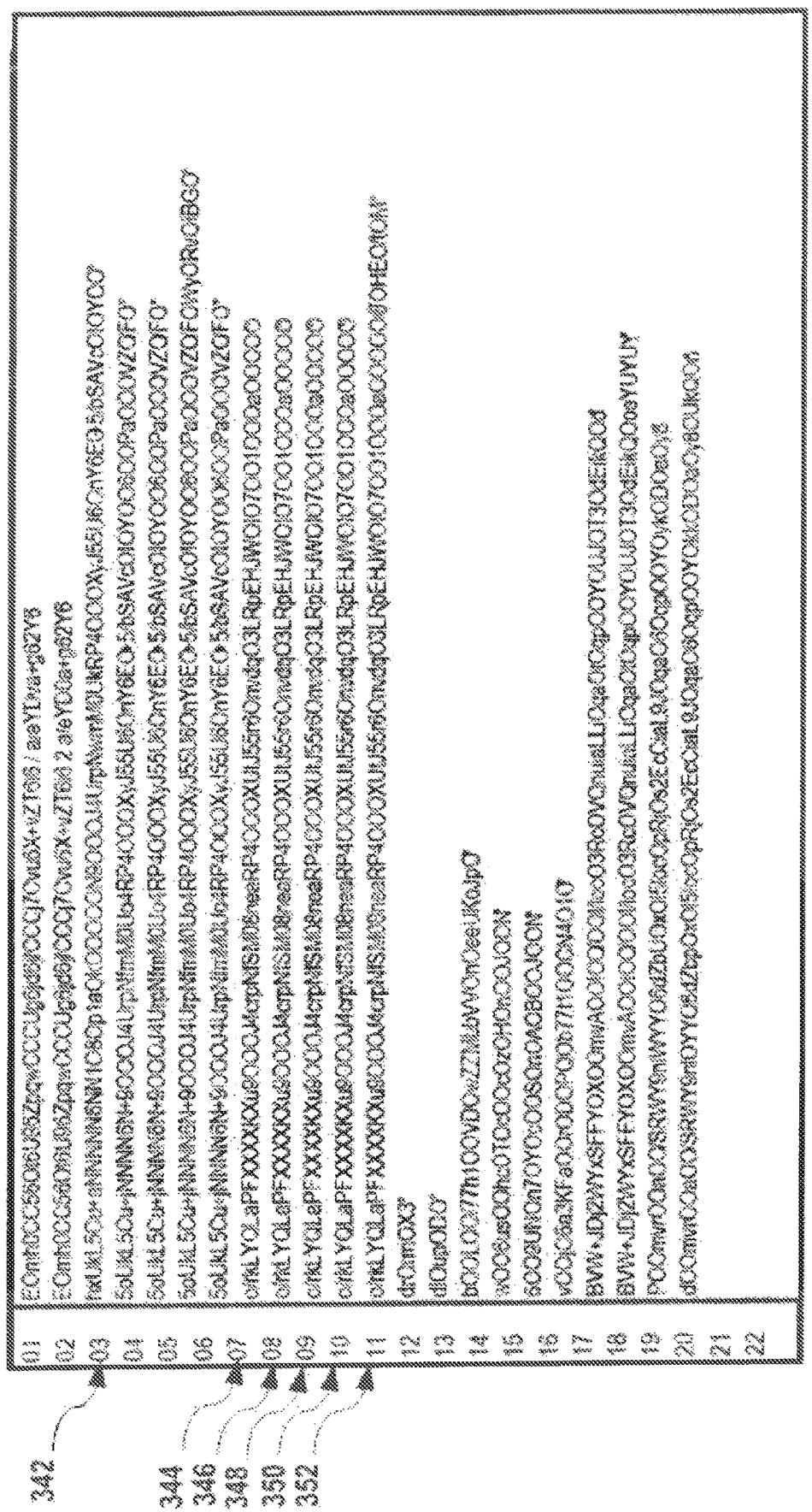
FIG. 3D illustrates examples of large hash digests generated for example alphanumeric strings.

FIG. 3C is an example alphanumeric string generated for an example AST. The depicted example is provided to merely illustrate an example alphanumeric string that was generated for some AST, and not necessarily for an AST depicted in FIG. 3B.

An example alphanumeric string 320 was generated by flattening an example AST. The flattening may include eliminating the spaces between the characters in the AST, eliminating the new line special characters in the AST, eliminating any other formatting special characters in the AST, and concatenating the remaining alphanumeric segments into one alphanumeric string 320.

Alphanumeric string 320 is divided into chunks. Various ways of dividing an alphanumeric string into chunks have been described above. In the depicted example, the boundaries between the chunks are depicted as boundaries 322, 324, 326, 328, 330. Other strings may be divided differently or using different approaches.

Example Large Hash Digest

FIG. 3D depicts examples of LHDs generated for example alphanumeric strings. The depicted examples are provided to merely illustrate examples of LHDs that were generated for some JS files, and not necessarily for a JS file depicted in FIG. 3A.

In the depicted example, the LHDs are listed in no particular order. Some of the LHD are like each other, other LHDs are different from any other LHDs on the list. For example, an LHD 342 listed in the third row does not seem to have any matching LHD on the list. Some other LHD match one or more other LHDs on the list. For example, LHDs 344, 346, 348, 350 and 352 appear to match each other. The matching LHDs may be grouped into the same cluster. Various ways of grouping LHDs into clusters have been described above.

Example File Clusters

Figure 3E:
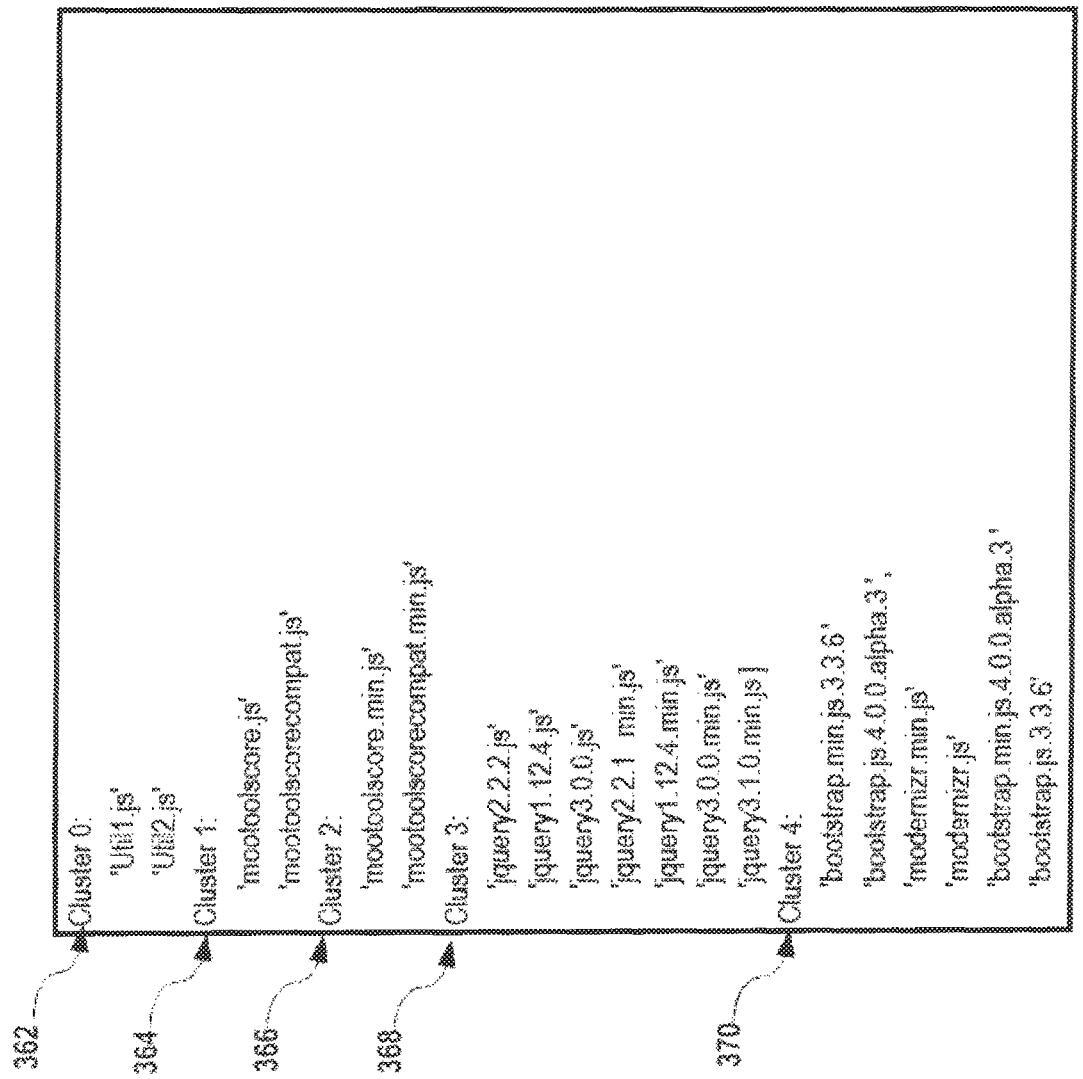
FIG. 3E illustrates examples of data file clusters.
Figure 4:
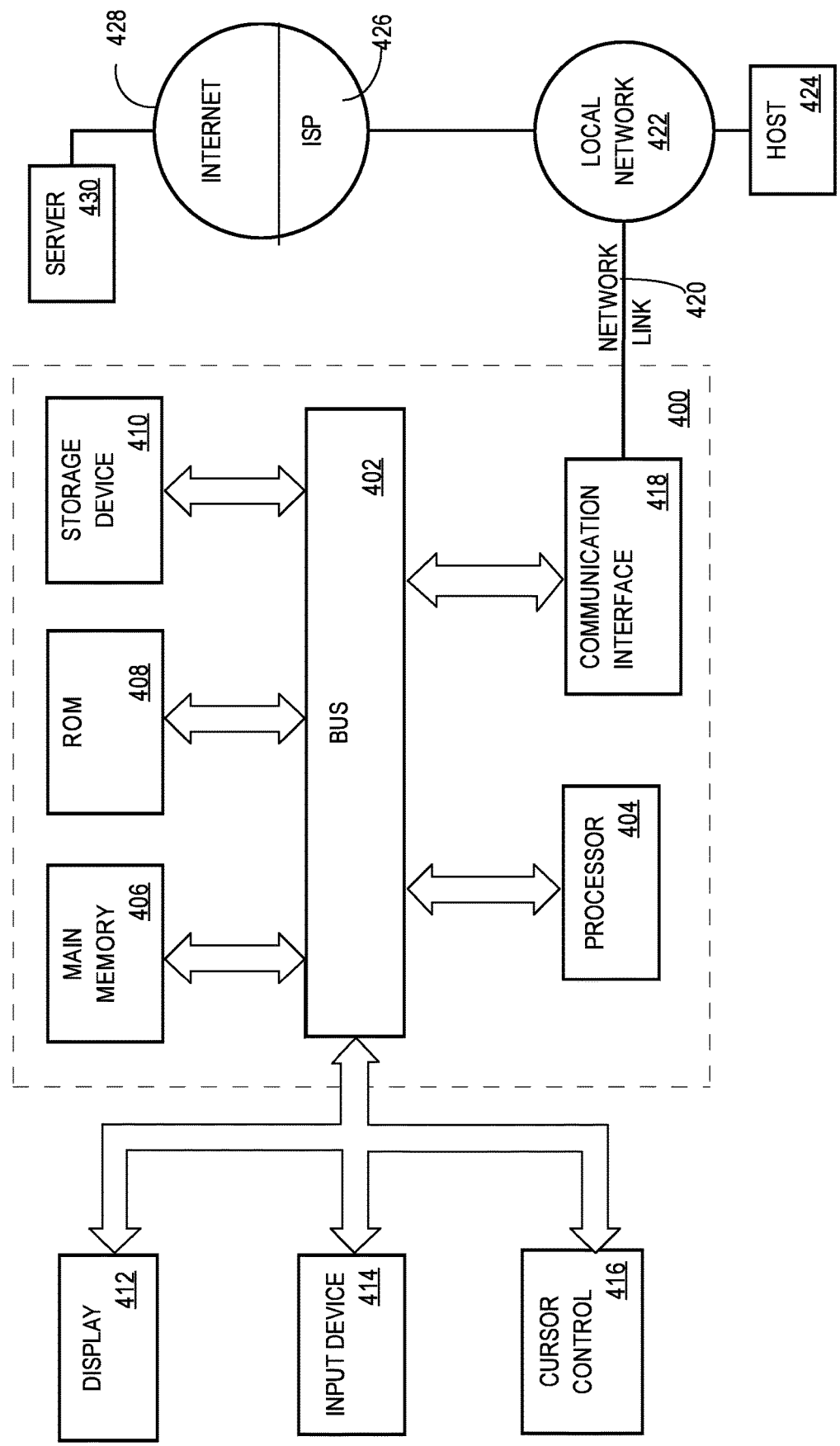
FIG. 4 illustrates a computer system that may be used to implement the techniques described herein.

FIG. 3E depicts examples of data file clusters. The examples are provided to merely illustrate some data file clusters that were created for some JS files, and not necessarily for a JS file depicted in FIG. 3A.

In the depicted example, certain files have been grouped into clusters. The grouping was performed based on Levenshtein distances computed for LHDs obtained for the certain files. The grouping was based on certain rules for determining whether two files belong to the same cluster. One rule may state for example, that two files belong to the same cluster if a Levenshtein distance computed for the corresponding LHDs does not exceed a certain threshold value.

FIG. 3E depicts clusters 362, 364, 366, 368, and 370. Other examples may include additional clusters. Cluster 362 includes two JS files. Since the two JS files belong to the same cluster, a conclusion may be drawn either that both files are malware-free or that both files are infected by a virus. If it is known that one of the two files is malware-free, then a conclusion may be drawn that both files are malware-free. However, if it is known that one of the two files has been compromised, then a conclusion may be drawn that both files have been compromised.

Cluster 364 includes two JS files. Again, if it is known that one of the two files is malware-free, then a conclusion may be drawn that both files are malware-free. However, if it is known that one of the two files has been compromised, then a conclusion may be drawn that both files have been compromised.

Cluster 366 includes two JS files. Determining whether the files are malware-free or are compromised may be performed in a similar fashion as for clusters 362 and 364.

Cluster 368 includes seven JS files. Determining whether the files are malware-free or are compromised may be performed in a similar fashion as for clusters 362, 364, and 366.

Cluster 370 includes six JS files. Determining whether the files are malware-free or are compromised may be performed in a similar fashion as for clusters 362, 364, 366, and 368.

In an embodiment, determining whether a particular file added to a cluster is malware-free or is compromised includes computing a probability that the particular file is malware-free. For example, if a cluster contains a particular file, three malware-free files and four compromised files, then the probability that the particular file is malware-free may be expressed as 3/7, or as 43%. The probability may also be computed using other methods, such as a weighted-ratio based method.

Benefits of Embodiments; Extensions

In an embodiment, a presented approach provides many benefits that are not obtainable using other approaches. For example, the techniques described herein allow detecting malicious program code before the code can be executed to potentially compromise a computer network. The approach allows scanning data files stored on any type of devices and in any type of computer networks to identify the files that may contain malicious code. Identifying malicious code in a data file includes performing an in-depth analysis of the file, and the analysis is performed before the file is disseminated throughout a network.

Determining whether a particular file includes malware is performed by clustering the particular file with other files in a unique way. The particular file may be clustered with the files that either are known to be malware-free or are known to be compromised. The clustering is based on computing distances between LHDs generated for the particular file and other files, and using the distances to assign the particular file to the cluster that includes the files that either are known to be malware-free or are known to be compromised.

In an embodiment, an approach may be enhanced by adapting a variety of additional rolling hashing techniques and using a variety of additional distance-computing techniques. The approach may be further enhanced by implementing machine-learning processes for optimizing rules for creating clusters for the files. For example, the malicious code detection system may be trained using a neural network to determine optimized rules for generating the clusters, and then the optimized rules may be deployed in production.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the approach may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio wave and infrared data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A method for detecting malicious code, the method comprising:

receiving, at a computer device, a file containing instructions in a programming language;

based on a syntax of the programming language, parsing, at the computer device, the file to generate parsed information, and based on the parsed information, generating a syntax tree for the file;

identifying, at the computer device, one or more alphanumeric strings in the syntax tree, and based on the one or more alphanumeric strings, generating a syntax string for the syntax tree;

generating, at the computer device, a hash digest by applying a piecewise hashing to the one or more alphanumeric strings in the syntax string by: dividing the syntax string into a plurality of chunks that are delineated by one or more delimiters, wherein a delimiter of the one or more delimiters is a unique string that is not present in the syntax string, generating a plurality of sub-digests for the plurality of chunks, and concatenating the plurality of sub-digests into the hash digest;

determining, at the computer device, whether the hash digest indicates that the file contains potentially malicious code;

in response to determining that the hash digest indicates that the file contains the potentially malicious code, performing a responsive action;

clustering one or more other hash digests computed for other known malicious code samples into groups, each group having a particular radius;

calculating one or more values of Levenshtein distances between the hash digest computed for the file and the one or more other hash digests computed for other known malicious code samples;

based on the one or more values of Levenshtein distances and the particular radius, determining whether to include the hash digest computed for the file into any of the groups created by clustering the one or more other hash digests;

in response to determining that the hash digest is to be included in a particular group of the groups, including the hash digest computed for the file into the particular group and determining that the hash digest indicates that the file contains the potentially malicious code.

2. The method of claim 1, further comprising:
calculating one or more values of Levenshtein distances between the hash digest and one or more other hash digests computed for the other known malicious code samples;
determining whether a particular value, of the one or more values of Levenshtein distances is smaller than a threshold value;
in response to determining that the particular value, of the one or more values of Levenshtein distances is smaller than the threshold value, determining that the hash digest indicates that the file contains the potentially malicious code.

3. The method of claim 2, further comprising: in response to determining that the particular value, of the one or more values of Levenshtein distances is not smaller than the threshold value, determining that the hash digest does not indicate that the file contains the potentially malicious code.

4. The method of claim 1, further comprising: in response to determining that the hash digest cannot be included in any group of the groups, determining that the hash digest does not indicate that the file contains the potentially malicious code.

5. The method of claim 1, wherein the piecewise hashing comprises a context triggered piecewise hashing.

6. The method of claim 1, wherein the file is received from one or more of: a computer server, a computer-implemented firewall, a client device, or a database server.

7. A computer system for detecting malicious code in a networked environment, the computer system comprising:
a detector computer in electronic communication with computing devices in a computer network, the detector computer programmed to:
receive a file containing instructions in a programming language;
based on a syntax of the programming language, parsing the file to generate parsed information, and based on the parsed information, generate a syntax tree for the file;
identify one or more alphanumeric strings in the syntax tree, and based on the one or more alphanumeric strings, generating a syntax string for the syntax tree;
generate a hash digest by applying a piecewise hashing to the one or more alphanumeric strings in the syntax string by: dividing the syntax string into a plurality of chunks that are delineated by one or more delimiters, wherein a delimiter of the one or more delimiters is a unique string that is not present in the syntax string, generating a plurality of sub-digests for the plurality of chunks, and concatenating the plurality of sub-digests into the hash digest;
determine whether the hash digest indicates that the file contains potentially malicious code;
in response to determining that the hash digest indicates that the file contains the potentially malicious code, perform a responsive action;
clustering one or more other hash digests computed for other known malicious code samples into groups, each group having a particular radius;
calculating one or more values of Levenshtein distances between the hash digest computed for the file and the one or more other hash digests computed for other known malicious code samples;
based on the one or more values of Levenshtein distances and the particular radius, determining whether to include the hash digest computed for the file into any of the groups created by clustering the one or more other hash digests;
in response to determining that the hash digest is to be included in a particular group of the groups, including the hash digest computed for the file into the particular group and determining that the hash digest indicates that the file contains the potentially malicious code.

8. The computer system of claim 7, wherein the detector computer is further programmed to:
calculating one or more values of Levenshtein distances between the hash digest and one or more other hash digests computed for other known malicious code samples;
determining whether a particular value, of the one or more values of Levenshtein distances is smaller than a threshold value;
in response to determining that the particular value, of the one or more values of Levenshtein distances is smaller than the threshold value, determining that the hash digest indicates that the file contains the potentially malicious code.

9. The computer system of claim 8, wherein the detector computer is further programmed to: in response to determining that the particular value, of the one or more values of Levenshtein distances is not smaller than the threshold value, determine that the hash digest does not indicate that the file contains the potentially malicious code.

10. The computer system of claim 7, wherein the detector computer is further programmed to: in response to determining that the hash digest cannot be included in any group of the groups, determine that the hash digest does not indicate that the file contains the potentially malicious code.

11. The computer system of claim 7, wherein the piecewise hashing comprises a context triggered piecewise hashing.

12. The computer system of claim 7, wherein the file is received from one or more of: a computer server, a computer-implemented firewall, a client device, or a database server.

13. One or more non-transitory computer-readable storage media storing one or more program instructions which, when executed by one or more computer processors, cause the one or more computer processors to perform:
receiving a file containing instructions in a programming language;
based on a syntax of the programming language, parsing the file to generate parsed information, and based on the parsed information, generating a syntax tree for the file;
identifying one or more alphanumeric strings in the syntax tree, and based on the one or more alphanumeric strings, generating a syntax string for the syntax tree;
generating a hash digest by applying a piecewise hashing to the one or more alphanumeric strings in the syntax string by: dividing the syntax string into a plurality of chunks that are delineated by one or more delimiters, wherein a delimiter of the one or more delimiters is a unique string that is not present in the syntax string, generating a plurality of sub-digests for the plurality of chunks, and concatenating the plurality of sub-digests into the hash digest;
determining whether the hash digest indicates that the file contains potentially malicious code;
in response to determining that the hash digest indicates that the file contains the potentially malicious code, performing a responsive action;
clustering one or more other hash digests computed for other known malicious code samples into groups, each group having a particular radius;

calculating one or more values of Levenshtein distances between the hash digest computed for the file and the one or more other hash digests computed for other known malicious code samples;

based on the one or more values of Levenshtein distances and the particular radius, determining whether to include the hash digest computed for the file into any of the groups created by clustering the one or more other hash digests;

in response to determining that the hash digest is to be included in a particular group of the groups, including the hash digest computed for the file into the particular group and determining that the hash digest indicates that the file contains the potentially malicious code.

14. The one or more non-transitory computer-readable storage media of claim 13, storing additional program instructions which, when executed by the one or more computer processors, cause the one or more computer processors to perform:

calculating one or more values of Levenshtein distances between the hash digest and the one or more other hash digests computed for other known malicious code samples;

determining whether a particular value, of the one or more values of Levenshtein distances is smaller than a threshold value;

in response to determining that the particular value, of the one or more values of Levenshtein distances is smaller than the threshold value, determining that the hash digest indicates that the file contains the potentially malicious code.

15. The one or more non-transitory computer-readable storage media of claim 14, storing additional program instructions which, when executed by the one or more computer processors, cause the one or more computer processors to perform: in response to determining that the particular value, of the one or more values of Levenshtein distances is not smaller than the threshold value, determining that the hash digest does not indicate that the file contains the potentially malicious code.

16. The one or more non-transitory computer-readable storage media of claim 13, storing additional program instructions which, when executed by the one or more computer processors, cause the one or more computer processors to perform: in response to determining that the hash digest cannot be included in any group of the groups, determining that the hash digest does not indicate that the file contains the potentially malicious code.

17. The one or more non-transitory computer-readable storage media of claim 13, wherein the piecewise hashing comprises a context triggered piecewise hashing; wherein the file is received from one or more of: a computer server, a computer-implemented firewall, a client device, or a database server.

* * * * *